Patented Dec. 12, 1922.

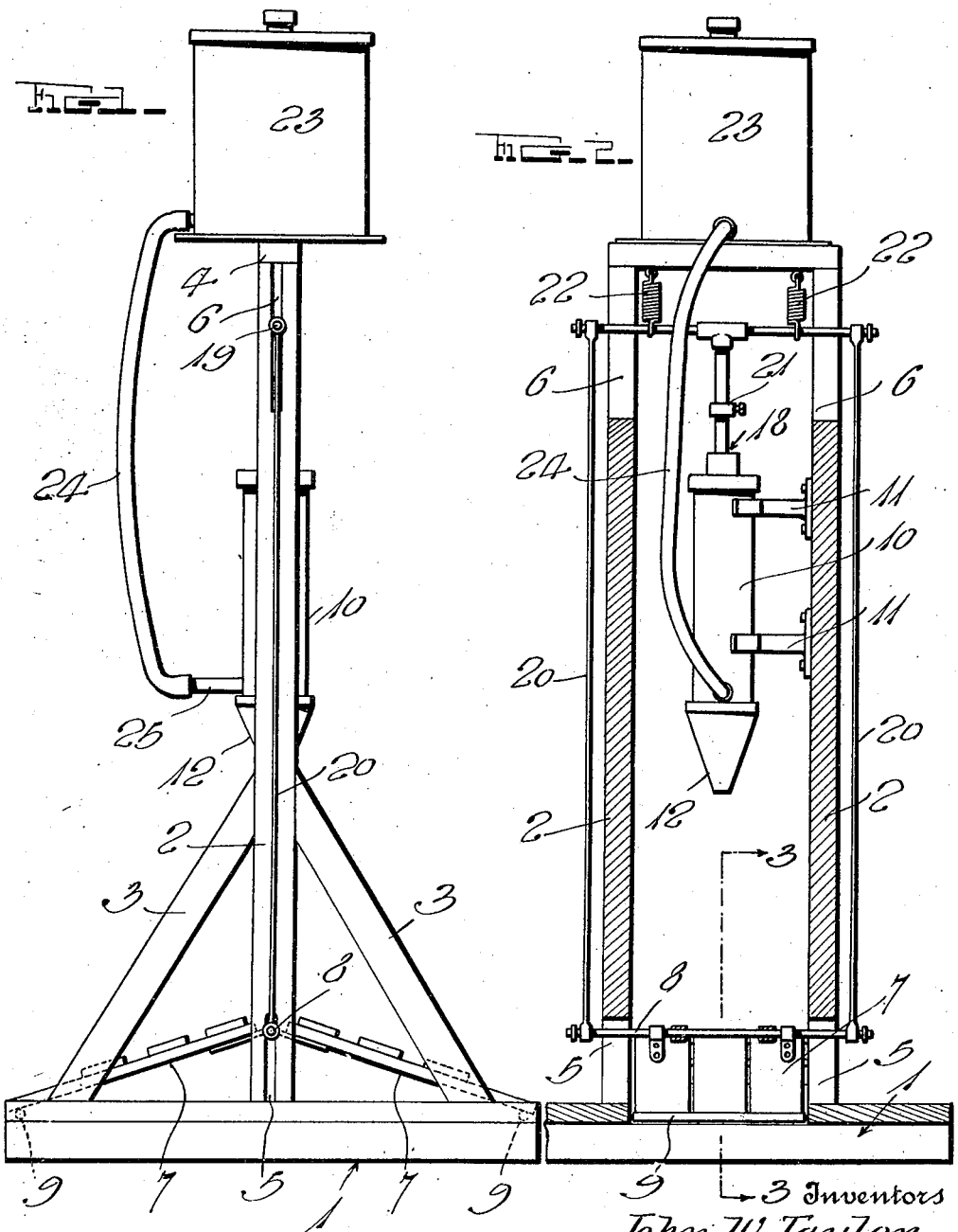

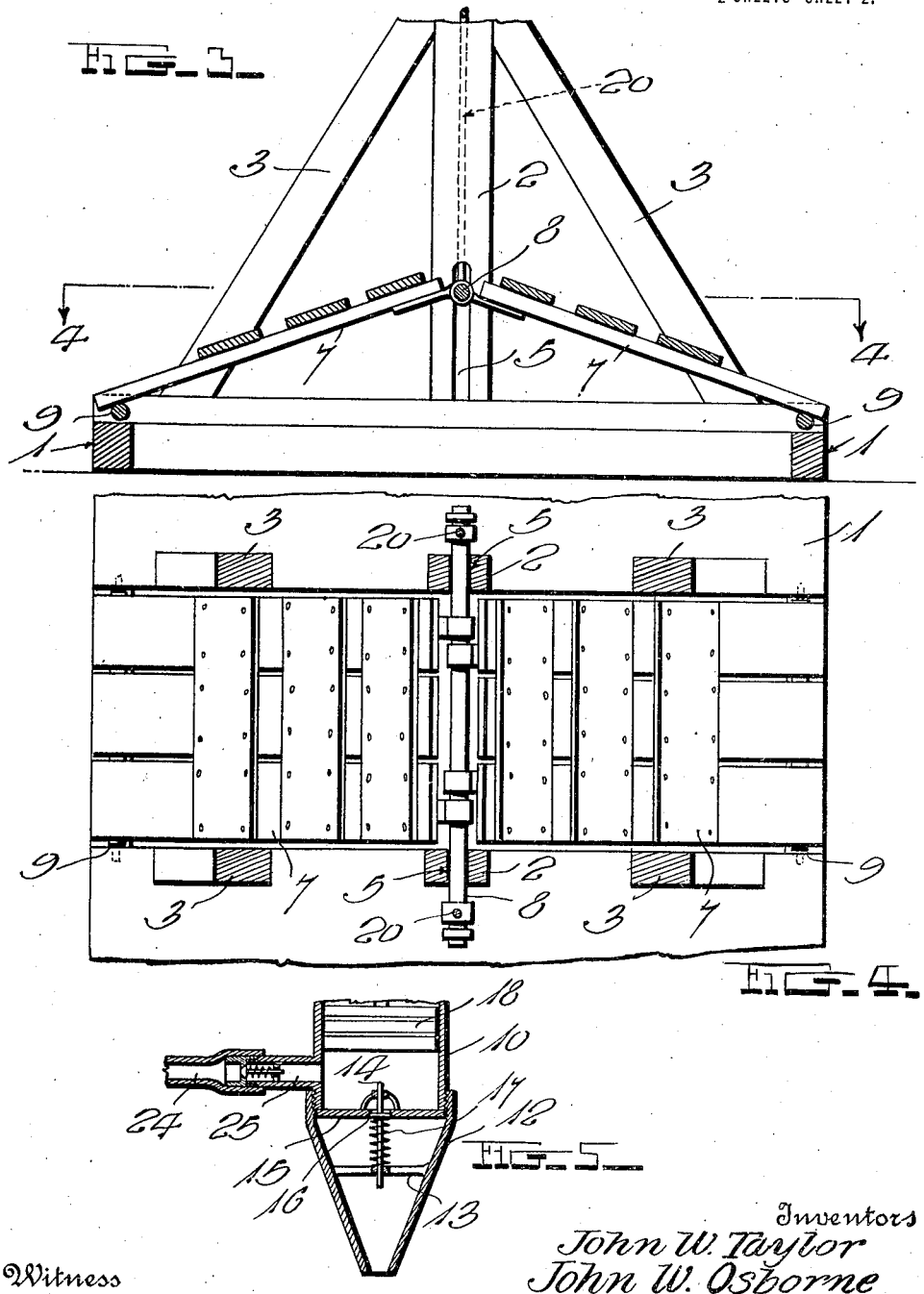

1,438,410

UNITED STATES PATENT OFFICE.

JOHN W. TAYLOR AND JOHN W. OSBORNE, OF WINCHESTER, ILLINOIS; SAID OSBORNE ASSIGNOR OF ONE-HALF OF HIS ENTIRE RIGHT TO WILLIAM E. TAYLOR, OF WINCHESTER, ILLINOIS.

AUTOMATIC HOG-OILING DEVICE.

Application filed June 6, 1921. Serial No. 475,541.

*To all whom it may concern:*

Be it known that we, JOHN W. TAYLOR and JOHN W. OSBORNE, citizens of the United States, residing at Winchester, in the county of Scott and State of Illinois, have invented certain new and useful Improvements in Automatic Hog-Oiling Devices; and we do declare the following to be a full, clear, and exact description of the invention, such as will enable others skilled in the art to which it appertains to make and use the same.

This invention relates to an automatically operative device for oiling hogs and other stock, on which devices of this class and spraying devices are employed, the one device being adapted for spraying oil, powder, or any other material used for treating animals of this class.

The principal object of the invention is to generally improve upon devices of this class by the provision of one of extreme simplicity and durability which embodies a dispensing device for the liquid which is positioned directly over the platform over which the animal must walk, this dispensing device embodying means for forcing the contents from the same onto the animal, and this means being such that only a predetermined amount of liquid can be forced therefrom, thus enabling the attendant to regulate the flow of liquid according to the size of the animals to be treated.

Another object of the invention is to provide a device of this class which is practical, extremely effective in operation, automatic in operation and comparatively inexpensive to both the manufacturer and the user.

Other objects and advantages of the invention will be apparent during the course of the following description.

In the accompanying drawings forming a part of this specification and in which like numerals are employed to designate like parts throughout the same:

Figure 1 is a side elevational view of an oiling device constructed in accordance with this invention.

Figure 2 is a central vertical sectional view taken at right angles to Fig. 1.

Figure 3 is a somewhat enlarged view taken substantially on the plane of the line 3—3 of Fig. 2.

Figure 4 is a horizontal sectional view taken substantially on the plane of the line 4—4 of Fig. 3.

Figure 5 is a detail sectional view of the lower end of the liquid dispensing container.

Referring to the drawings by numerals, it will be seen that the device comprises a support 1 on which are supported a pair of oppositely disposed uprights 2 strengthened and held in proper place, if desired, by diagonal braces 3 and connected together at their upper ends by means of a cross-piece 4. It may be stated here that near their bottoms and near their tops, these uprights 2 are provided with elongated guide slots 5 and 6 respectively, which serve a purpose to be hereinafter set forth.

Broadly speaking, one or more retracable platforms 7 are positioned between the uprights 2 and a dispensing device is arranged between these uprights and above these platforms so that the animal in passing between the uprights and over the platforms will be sprayed with the liquid from the dispensing device, which is automatically operated through mechanism associated with the latter and with the platforms. Described in detail, it will be seen that the platforms are pivotally connected at their inner ends with a cross rod 8, their outer ends being free and resting loosely on top of rollers 9 mounted on the aforesaid base 1. It may be pointed out here that the rod 8 is of sufficient length to extend through the aforesaid guide slots 5 so that it is properly held in place and in turn serves to hold the platforms in their proper positions. The dispensing device referred to is preferably in the form of a cylindrical container 10 which is connected with brackets 11 carried by one of the uprights 2. Referring to the enlarged sectional view of the lower end of this container of Fig. 5, it will be seen that it is equipped with a conical outlet 12 in which spider arms 13 are arranged, the point at which the arms intersect one another being formed with an aperture to permit passage of a valve stem 14 therethrough, the latter extending through an opening formed in the partition 15 and carrying a suitable valve 16 for closing this opening, a spring 17 surrounding the same and serving to normally close the opening by means of the valve. It is of course understood that while this portion of the dispensing device has been described in detail, the construction and arrangement of parts may be varied within the scope of the invention as claimed. As before indicated, the container 10 is designed to contain a quantity of oil, since the device is especially designed for oiling hogs. Also, as before indicated, a piston 18 is slidably mounted inside of the container and serves to force the oil through the opening in the partition 15 and out through the outlet opening in the conical part 12 when the piston is reciprocated. In order to reciprocate this piston, we connect the upper end of the rod thereof with another cross-bar 19 and connect this cross bar with the afore-mentioned cross bar 8 by means of vertically disposed rods 20. Hence, when the platforms 7 are depressed by the weight of the hog passing over them, a downward pull will be exerted on the parts 19 and 20 and the piston will be forced inwardly into the container 10 to force a quantity of the oil from the container. We have before pointed out that it is desirable to regulate the amount of liquid dispensed from this container and we therefore place an adjustable collar 21 on the exposed portion of the piston rod so that this collar will come into contact with the container and the sliding movement of the piston thereby limited. By limiting the movement of the piston, the quantity of oil permitted to pass from the container can be controlled. It may be pointed out here, that the spring 17 which serves to close the valve 16, is sufficiently strong to retain the valve closed even when a considerable quantity of oil is inside of the container, that is, if the piston is not moved. Of course, when the piston is moved, the pressure exerted against the valve becomes sufficient to open the latter. After each hog is treated, it is desirable to return the piston, platforms and other parts to their normal positions, and in order to accomplish this, we make use of two or more coiled springs 22 which are connected at one their ends with the cross bar 19 and at their opposite end with the cross-piece 4 on top of the aforesaid uprights. The cross-piece 4 also serves to permit an oil reservoir 23 to be supported thereon, the latter serving to supply oil or other liquid to the container 10 through the hose 24 which connects with the valved inlet neck 25 on the container 10.

In operation, the device is arranged at the entrance of the hog pen or other place in which the hogs are kept and in passing in and out of the latter, the hog is caused to tread on one of the platforms 7. In so doing, the platform is depressed and the aforesaid piston 18 is forced inwardly into the container 10 through the medium of the cross-bars and connections described, its sliding movement being restricted by means of a stop collar 21. As before stated, when the piston moves inwardly this way, the pressure exerted against the valve 16 becomes sufficiently great to open this valve and permit the oil to be dispensed therefrom and onto the animal.

When the piston moves upwardly, a vacuum is created below it and this serves to open the valve in the tubular extension 25 so that a quantity of oil is permitted to enter the dispensing container 10. It therefore follows that the piston serves to automatically and alternately operate the spring-closed valves on its up and down stroke and serves to forcibly spray a predetermined quantity of oil onto the animal each time the platforms are depressed. Particular emphasis is to be laid on the means for enabling the amount of liquid dispensed to be controlled for the different sizes of hogs.

By carefully considering the foregoing description in connection with the accompanying drawings, persons familiar with devices of the class under consideration will doubtless be able to obtain a clear understanding of the invention. In view of this, a more lengthy and detailed description is deemed unnecessary.

Since probably the best results may be obtained with the construction and arrangement herein shown and described, this is taken as the preferred embodiment of the invention. However, slight minor changes coming within the scope of the subjoined claims may be resorted to.

We claim:

1. A device of the class described comprising a supporting structure, a dispensing container for liquid having a valved outlet, force feed means for opening said valve and for forcibly spraying the liquid onto the animal, animal actuated means for actuating said force feed means, and means for controlling the action of the latter to vary the amount of liquid discharged according to the size of the animal.

2. A device of the class described comprising a supporting structure including oppositely disposed uprights, brackets carried by one of said uprights, an oil containing and dispensing device connected with said brackets, said dispensing device including a cylinder having a valved outlet and a piston slidable in said cylinder, an adjustable stop-collar on the exposed portion of the piston rod, and a platform-controlled operating means for said piston.

3. A hog oiling device including a supporting structure, an oil dispensing container supported thereon in a position to spray the liquid onto the animal passing beneath it, a piston slidable in said container, the latter being provided with a discharge valve controlled by said piston and the piston serving to forcibly spray the liquid onto the animal, a cross-member connected to the piston rod, animal actuated platforms beneath said container, connections between said cross piece and platforms, spring means for retracting the piston, and a reservoir arranged on said supporting structure and having a conduit communicating with said container.

4. A device of the class described comprising a supporting structure including a base having a pair of oppositely disposed slotted uprights rising therefrom, a pair of tilting platforms arranged between said uprights and resting on said base, a cross-rod extending through the guide slots in said uprights, the inner ends of said platforms being pivotally connected to said cross-rod, a liquid dispensing container supported between said uprights and over said platforms, a valve for controlling the discharge of liquid from said container, a piston for forcing a quantity of the liquid from said container and for opening said valve, means associated with said piston and container for limiting the sliding movement of the piston, a cross-rod connected to the piston rod and slidable in the remaining guide slots in the aforesaid uprights, and rods connecting both of said cross-rods to operate the piston when the platforms are depressed, and spring means connected with the upper cross rod for returning the parts of the device to inoperative position when the platforms are occupied.

5. An oil dispensing device of the class described including a support, a valved dispensing cylinder mounted on said support, a reservoir also mounted on said support, a valved conduit leading from the latter to the cylinder, a piston in the latter for automatically and alternately operating the valves to forcibly spray oil onto the animal on the down-stroke of the piston and to replenish the cylinder with oil from the reservoir on the up-stroke of the latter, and animal actuating means for automatically operating said piston.

In testimony whereof we have hereunto set our hands.

JOHN W. TAYLOR.
JOHN W. OSBORNE.